June 8, 1965  J. W. POWELL  3,187,846
PIVOTED PAWL PARKING BRAKE MECHANISM
Filed May 21, 1963                    3 Sheets-Sheet 1

INVENTOR:
JOHN W. POWELL
BY
ATTORNEYS.

June 8, 1965

J. W. POWELL 3,187,846

PIVOTED PAWL PARKING BRAKE MECHANISM

Filed May 21, 1963

INVENTOR:
JOHN W. POWELL
BY
ATTORNEYS.

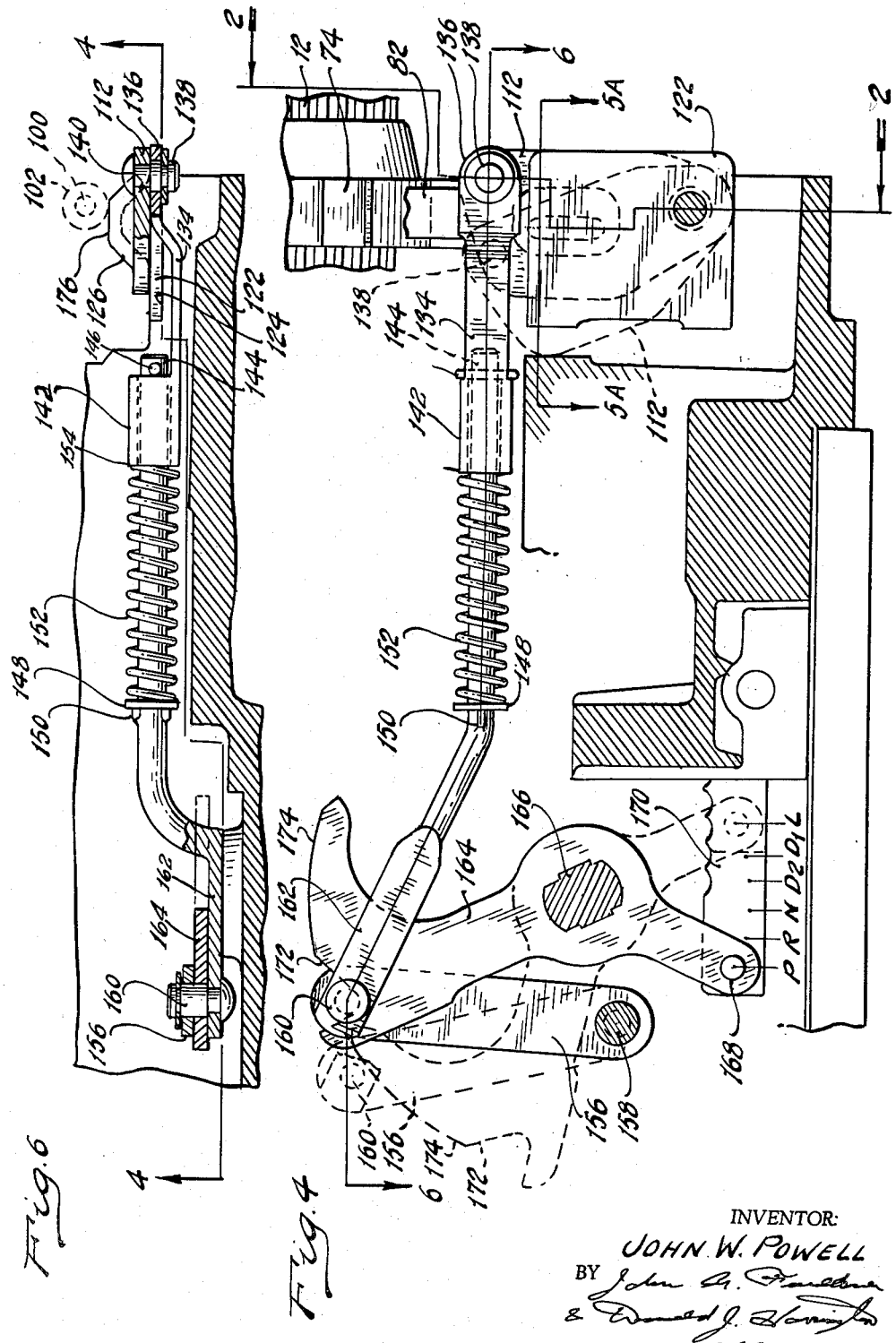

United States Patent Office 3,187,846
Patented June 8, 1965

3,187,846
PIVOTED PAWL PARKING BRAKE MECHANISM
John W. Powell, Garden City, Mich., assignor to Ford Motor Company, Dearborn, Mich., a corporation of Delaware
Filed May 21, 1963, Ser. No. 282,014
7 Claims. (Cl. 188—69)

My invention relates generally to brakes, and more particularly to a positive acting parking brake that is adapted especially to be used with automatic power transmission mechanisms for automotive vehicles.

Parking brake mechanisms that are used with automotive vehicle power transmission mechanisms usually employ a ratchet type parking gear and gear engaging pawl, the latter being connected to a transmission tailshaft housing. The gear is connected to a driven member or the tailshaft of the transmission mechanism. Linkage means are provided for urging the pawl into registry with the teeth of the parking gear thereby establishing a positive connection between the driven member and the stationary transmission housing.

The parking pawl linkage mechanism is personally operable by the vehicle operator and relatively complex motion transmitting linkage elements are employed for this purpose. For example, toggle linkage arrangements are often employed for moving the pawl into registry with the teeth of the parking gear and releasing it in response to controlling movements of a driver operated control linkage. Since the pawl does not always register with the teeth of the parking gear, the linkage elements are provided with a lost motion connection so that the pawl may be urged toward a braking position following adjustment of the control linkage mechanism by the operator to a brake applying position. Upon subsequent movement of the driven member of the transmission mechanism, the pawl then will snap into engagement with its associated parking gear.

Provision must be made also for withdrawing the pawl from the parking position when the controlling linkage is moved to a brake release position by the operator. This must be done with a minimum amount of driver effort. The gear tooth loading of the parking gear and the pawl may prevent the vehicle operator from adjusting a conventional brake controlling linkage mechanism to a brake release position if the vehicle is parked on a grade.

It is an object of my invention to provide a simplified parking brake mechanism of this type which is capable of controlling the operation of a parking brake pawl with a minimum amount of driver effort.

It is a further object of my invention to provide a parking brake mechanism for an automatic power transmission wherein the brake actuating control elements are disposed within the transmission housing with a minimum amount of space being required.

It is a further object of my invention to provide a parking brake mechanism for a power transmission mechanism which is characterized by a relatively high mechanical advantage during movement of the brake operating control member.

It is a further object of my invention to provide a parking brake mechanism of the type above set forth wherein the reaction for the force that is used to engage the parking pawl may be transmitted directly to the transmission housing.

For the purpose of describing more particularly the improvements of my invention, reference will be made to the accompanying drawings, wherein:

FIGURE 4 shows a subassembly view of a portion of the mechanism of FIGURE 2 as viewed from the plane of section line 4—4 of FIGURES 6 and 2;

FIGURE 5A is a cross sectional view taken along the plane of section 5A—5A of FIGURE 4;

FIGURE 5B is a view similar to the view of FIGURE 5A, although it shows the parking brake in a braking position. It is taken along the plane of section line 5B—5B of FIGURE 2;

FIGURE 6 is a cross sectional view taken along the plane of section 6—6 of FIGURE 4; and, FIGURE 7 is a cross sectional view taken along the plane of section line 7—7 of FIGURE 2.

Figure 1:
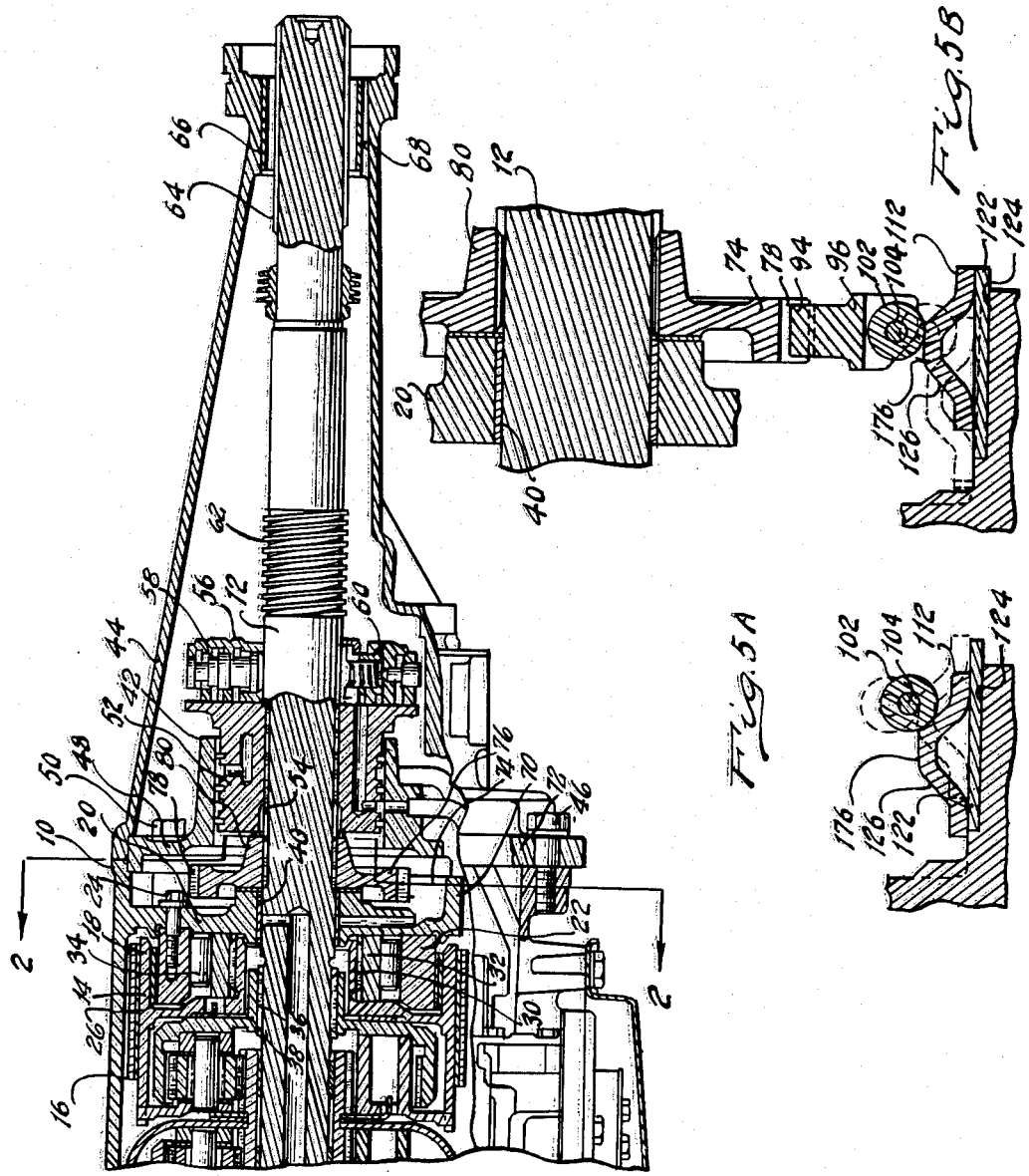
FIGURE 1 shows a partial cross sectional view of a power transmission mechanism having a parking gear connected to its power output shaft.

Referring first to FIGURE 1, a transmission housing is indicated generally by reference character 10. Situated within the housing 10 are torque delivery gear elements that establish plural torque delivery paths between a driving member, not shown, and a power output shaft 12. Clutch and brake elements are employed in the usual fashion for regulating the relative motion of gear elements to establish multiple speed ratios.

One of the brake elements is identified in FIGURE 1 by reference character 14. It comprises a brake band 16 situated about a brake drum 18. This drum forms a torque reaction path for the gear elements during operation in one speed ratio.

The housing 10 includes an end wall 20. Secured to this wall is an annular brake race 22, suitable bolts 24 being provided for this purpose. The outer peripheral surface 26 of the race 22 forms a support for the brake drum 18. A suitable bushing is suituated between drum 18 and the surface 26 of boss 22.

The hub of brake drum 18 is externally splined as shown at 30. Connected to this splined hub is an inner brake race 32 about which is positioned a plurality of overrunning brake elements 34. The inner surface of the boss 22 forms an outer race for the overrunning brake shown in part at 34, and it may be cammed to establish a one-way braking action. Thus, the brake drum 18 can be held against rotation in one direction, but it is free to rotate in the opposite direction whenever brake band 16 is released.

Shaft 12 is splined at 36 to the hub 38 of a member that is connected in turn to one of the gear elements of the gear mechanism. Shaft 12 is journalled by means of bushing 40 within an opening in the wall 20.

Connected also to the wall 20 is a sleeve 42 which is situated within a transmission tailshaft extension housing 44. This housing is bolted by means of bolts 46 to the housing 10. The sleeve 42 in turn is flanged as shown at 48 and is connected to the wall 20 by means of bolts 50.

Situated within the sleeve 42 is a fluid pressure distributor manifold 52. It is splined at 54 to the shaft 12 so that it rotates in unison therewith.

Connected to manifold 52 is a governor body 56 which carries governor valve elements 58 and 60. These in turn are utilized by an automatic control valve, not shown, for establishing a pressure signal that is proportional in magnitude to the driven speed of the shaft 12.

A vehicle speedometer driving gear 62 is formed on shaft 12. Shaft 12 includes also a splined portion 64 which may be connected drivably to a universal joint yoke that in turn forms a portion of a connection between shaft 12 and a transmission drive shaft. This yoke can be journalled by means of bushing 66 within a bearing opening 68 formed at the extremity of the tail shaft housing 44.

The drive shaft in turn may be connected drivably to the vehicle traction wheels in a conventional fashion.

The wall 20 is formed in two parts that are separately identified by reference characters 70 and 72. They cooperate to define a cavity 74 within which is situated a parking gear 76. This gear is formed with external teeth 78, and its hub 80 is splined or keyed to the shaft 12.

Figure 2:
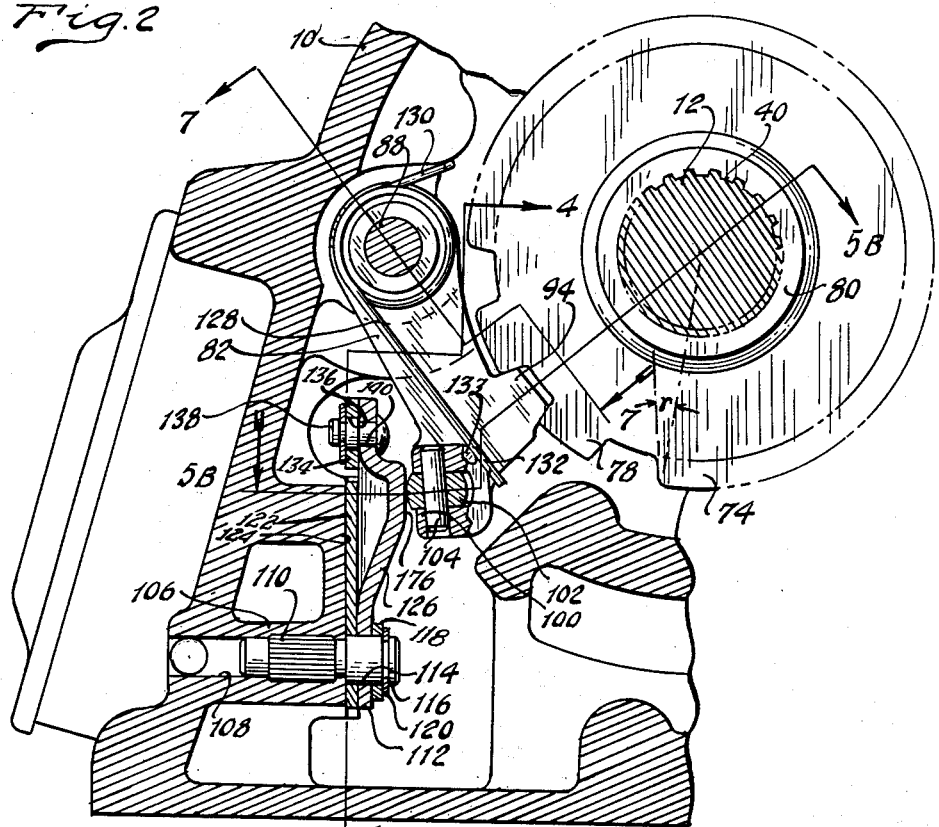
FIGURE 2 is a partial transverse cross sectional view taken along the plane of section line 2—2 of FIGURES 1, 4 and 7.
Figure 3:
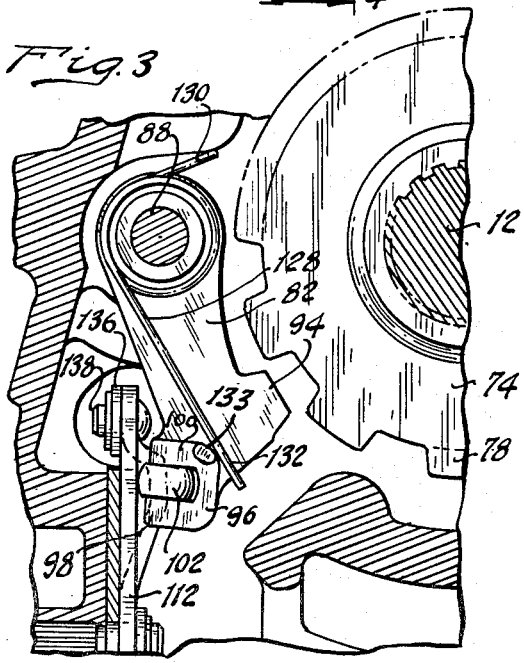
FIGURE 3 is a partial transverse cross-sectional view similar to FIGURE 2 showing the parking pawl of FIGURE 2 in a non-braking position.
Figure 7:
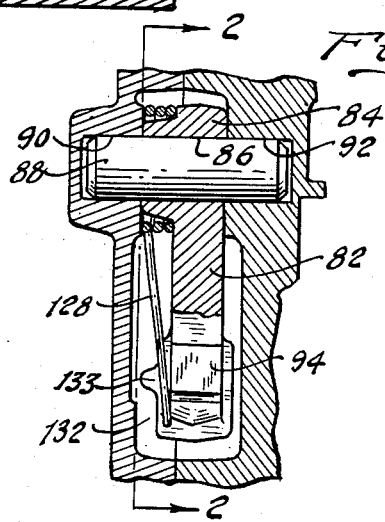

Referring next to FIGURES 2, 3 and 7, a parking pawl is shown at 82. It comprises a hub portion 84 having formed therein transverse opening 86 through which a pivot shaft 88 is received. This shaft in turn is end supported in openings 90 and 92 formed in the transmission housing 10.

The extended end of pawl 82 has formed thereon a ratchet tooth 94. The side angles of the tooth 94 are designated in FIGURE 2 by the symbol γ. In a preferred embodiment, this angle is 19 degrees and 30 seconds although some deviation from this angularity can be made if desired. The side angles on the gear teeth 78 correspond to the side angles of the tooth 94. When the gear 76 is loaded, the tangential force at the region of the contact between tooth 94 and the teeth 78 will tend to urge the pawl 82 radially outwardly to a release position. It is not possible, therefore, for the pawl to remain engaged with its parking gear unless an engaging force is applied to it.

The radially outward end of pawl 82 is formed with a yoke portion 96 having arms 98 and 100. Journalled within arms 98 and 100 is a roller 102. It is mounted upon a supporting shaft 104 that in turn is received within aligned openings formed in the arms 98 and 100. The roller 102 is adapted to rotate about the shaft 104, the axis of the roller 102 being transversely disposed with respect to the axis of oscillation of the pawl 82.

The housing 10 includes also a boss 106 having formed therein an opening 108. Situated within the opening 108 is an anchor pin 110 having external serrations which establish a force fit between the pin 110 and the opening 108.

Journalled upon the extended end of pin 110 is a cam plate 112. This plate is formed with an opening 114 through which the pin 110 extends. A head 116 is formed on the end of the pin 110 to hold the cam plate axially fast. A thrust washer 118 and a retainer ring 120 are carried by shaft 110 for maintaining the cam plate 112 in a fixed axial position with respect to the shaft 110.

A bearing plate, which may be formed at least in part by bronze bearing material, is situated adjacent the cam plate 112, as shown at 122. It is formed with an opening through which shaft 110 extends. It engages a shoulder 124 formed on the housing boss 106.

Cam plate 112 includes a cam portion 126. This cam portion 126 is engaged by roller 102 as the cam plate 112 is pivoted about the axis of the shaft 110.

Pawl 82 normally is urged in a radially outward direction with respect to the axis of the shaft 12 by means of a pawl release spring 128. This spring includes multiple turns that encircle the hub 84 for the pawl 82. One end 130 of this spring 128 engages a stationary adjacent portion of the housing 10. The other end 132 of the spring 128 engages a shoulder 133 formed on a radially outward location on the pawl 82. The spring 128 is prestressed so that a constant force is applied to the pawl 82 thereby tending to urge the latter in a clockwise direction as viewed in FIGURE 2.

A cam plate 112 is connected by means of a pin connection to a control rod element 134 as best seen in FIGURES 4 and 6. This connection is provided by an eyelet 136 carried by the element 134 and by pin 138 that is received through the eyelet 136 and through a cooperating opening 140 formed at a radially outward location on the cam plate 112.

The element 134 is formed at its end with an eyelet 142 through which another control rod element 144 extends. Relative motion between the elements 142 and 134 is limited by a pin 146 carried by the element 144.

Element 144 carries also a washer 148 and it is held axially fast with respect to element 144 by abutments 150. A spring 152 is situated between washer 148 and the end 154 of eyelet 142.

The extended end of element 144 is connected pivotally to a control link 156 which in turn is pivoted to the transmission housing 10 by means of a stationary pivot shaft 158 supported by the housing 10. The extended end of link 156 is formed with an opening which receives a pin 160. This pin in turn is carried by the end 162 of the control link element 144.

Situated between link 156 and the end 162 is a cam element 164. This element 164 is connected positively to a rotatable parking brake actuator shaft 166 which in turn is under the control of the vehicle operator. Shaft 166 can extend outwardly to a suitable driver operated control lever situated at the exterior of the transmission mechanism. This lever in turn can be connected to the driver operated transmission drive range selector lever located within the vehicle passenger compartment.

Connected also to cam lever 164 is an arm 168 that in turn is mechanically connected to a manual range selector valve 170 which forms a part of an automatic control valve system not shown. Reference may be made to the copending U.S. application of Richard L. Leonard and R. P. Zundel, Serial Number 277,855, for a particular description of the control system and gear mechanism to which reference is made in this specification. This copending application is assigned to the assignee of my instant invention.

Cam lever 164 includes a recessed portion 172 within which the pin 160 is situated. When the lever 164 assumes the position shown in FIGURE 4 by means of solid lines, the parking mechanism is in the brake applying position. If the lever 164 is moved to the solid line position shown in FIGURE 4, the cam plate 112 will be rotated in a clockwise direction as viewed in FIGURE 4, thereby allowing roller 102 to ride up the cam 126. This in turn causes counterclockwise rotation of the pawl 82 as viewed in FIGURE 2, so that it will engage the teeth of the parking gear. If the teeth of the parking gear and the pawl are misaligned, the spring 152 will yield, thereby permitting a ratcheting action to occur. As soon as the shaft 12 is rotated slightly, the pawl 82 will be urged into the braking position under the influence of the force of spring 152.

Upon movement of the cam lever 164 in a counterclockwise direction, as viewed in FIGURE 4 by means of dashed lines, the pin 160 will ride up the side of the recess 172 and will engage cam surface 174. Continued movement of the cam lever 164 in a counterclockwise direction will cause the pin 160 to move about the axis of shaft 158 thereby urging the control lever elements 144 and 134 in a left-hand direction as viewed in FIGURE 4. This in turn causes the cam plate 112 to pivot in a counterclockwise direction as viewed in FIGURE 4, thereby allowing the roller 102 to ride down the cam 126. If the shaft 12 is not subjected to torque, the spring 128 then will release the pawl 82 from engagement with the gear 76. When the parking gear is engaged, the roller 102 assumes the position shown in FIGURE 5B. The cam portion 126 is formed with a flat apex 176. The transverse thrust produced by reason of the camming action between cam 126 and the roller 102, is transmitted through the bearing plate 122 into the boss 124.

Having thus described the preferred embodiment of my invention, what I claim and desire to secure by United States Letters Patent is:

1. In a parking brake mechanism for braking a driven member of a power transmission mechanism, a parking gear carried by said driven member, a parking pawl rotatably mounted upon a stationary portion of said mechanism, said pawl having an extended end with a tooth formed thereon, said tooth being engageable with cooperating teeth of said parking gear and movable about an axis parallel to the axis of said parking gear, a cam plate pivotally mounted on a stationary portion of said mechanism for rotation about an axis that is transverse to the axis of said parking gear, a reaction shoulder carried by said stationary portion and situated adjacent said cam plate to accommodate reaction forces applied to said cam plate, said cam plate including a raised cam portion engageable with said extended end of said pawl and rising from the plane of rotation of said cam plate toward said parking gear, a personally operable linkage element connected to said cam plate at a location that is radially outward from said raised cam portion with respect to said transverse axis whereby rotary motion of said cam plate produces a force on said extended end of said pawl in a direction parallel to said transverse axis, said pawl tooth being forced into engagement with said parking gear upon engagement of said extended end with said raised cam portion.

2. In a parking brake mechanism for braking a driven member of a power transmission mechanism, a parking gear carried by said driven member, a parking pawl rotatably mounted upon a stationary portion of said mechanism, said pawl having an extended end with a tooth formed thereon, said tooth being engageable with cooperating teeth of said parking gear and movable about an axis parallel to the axis of said parking gear, a cam plate pivotally mounted on a stationary portion of said mechanism for rotation about an axis that is transverse to the axis of said parking gear, a reaction shoulder carried by said stationary portion and situated adjacent said cam plate to accommodate reaction forces applied to said cam plate, said cam plate including a raised cam portion engageable with said extended end of said pawl and rising from the plane of rotation of said cam plate toward said parking gear whereby rotary motion of said cam plate produces a force on said extended end of said pawl in a direction parallel to said transverse axis, said pawl tooth being forced into engagement with said parking gear upon engagement of said extended end with said raised cam portion, a personally operable control rod connected to said cam plate at a location that is spaced radially outwardly from said raised cam portion, said control rod comprising two elements, and a yieldable lost motion connection between said elements comprising a compression spring disposed between separate spring seat portions carried by each of said elements respectively, said spring being adapted to urge the cam plate to a brake applying position upon adjustment of one control element in one direction.

3. In a parking brake mechanism for braking a driven member of a power transmission mechanism, a parking gear carried by said driven member, a parking pawl rotatably mounted upon a stationary portion of said mechanism, said pawl having an extended end with a tooth formed thereon, said tooth being engageable with cooperating teeth of said parking gear and movable about an axis parallel to the axis of said parking gear, a cam plate pivotally mounted on a stationary portion of said mechanism for rotation about an axis that is transverse to the axis of said parking gear, a reaction shoulder carried by said stationary portion and situated adjacent said cam plate to accommodate reaction forces applied to said cam plate, said cam plate including a cam portion engageable with said extended end of said pawl whereby rotary motion of said cam plate results in movement of said pawl tooth into engagement with said parking gear, a personally operable control rod connected to said cam plate, said control rod comprising two elements, a yieldable lost motion connection between said elements comprising a compression spring disposed between separate spring seat portions carried by each of said elements respectively, said spring being adapted to urge the cam plate to a brake applying position upon adjustment of one control rod element in one direction, linkage means for applying a force to said one control rod element in the other direction, said force applying means comprising a control link mounted upon a stationary portion of said mechanism, a connection between the extended end of said control link and said other control rod element, and a cam lever pivotally mounted for rotation about a fixed axis, said cam lever comprising a cam surface engageable with a portion of the connection of said control link and said other control element upon rotation thereof in one direction.

4. In a parking brake for a power transmission mechanism, a parking gear carried by a driven shaft of said mechanism, said driven shaft being rotatably journalled within a stationary transmission housing, a parking pawl having a pivoted end and an extended end, said pawl being adapted for oscillatory motion about an axis that is parallel to the axis of said parking gear, a roller element carried by the extended end of said pawl, a cam plate pivotally mounted on said housing for rotation about an axis that is perpendicularly disposed with respect to the axis of said parking gear, said cam plate comprising a raised cam portion engageable with said roller element and rising from the plane of rotation of said cam plate toward said parking gear, a personally operable linkage element connected to said cam plate at a location spaced radially outwardly from said raised cam portion whereby said cam plate produces a force on said roller element in a direction parallel to said perpendicular axis to urge said pawl into locking engagement with said parking gear upon movement of said cam plate in one direction, and a reaction shoulder formed on said transmission housing and situated adjacent said cam plate whereby thrust forces transmitted from said pawl to said cam plate are transferred directly to said housing.

5. In a parking brake for a power transmission mechanism, a parking gear carried by a driven shaft of said mechanism, said driven shaft being rotatably journalled within a stationary transmission housing, a parking pawl havig a pivoted end and an extended end, said pawl being adapted for oscillatory motion about an axis that is parallel to the axis of said parking gear, a roller element carried by the extended end of said pawl, a cam plate pivotally mounted upon said housing for rotation about an axis that is perpendicularly disposed with respect to the axis of said parking gear, said cam plate comprising a raised cam portion engageable with said roller element and rising from the plane of rotation of said cam plate toward said parking gear, a personally operable linkage element connected to said cam plate at a location spaced radially outwardly from said raised cam portion whereby said cam plate produces a force on said roller element in a direction parallel to said perpendicular axis to urge said pawl into locking engagement with said parking gear upon movement of said cam plate in one direction, a reaction shoulder formed on said transmission housing and situated adjacent said cam plate whereby thrust forces transmitted from said pawl to said cam plate are transferred directly to said housing, and a driver controlled linkage comprising two elements, one linkage element being pivotally connected to said cam plate, and a yieldable lost motion connection between said linkage elements including means for applying a force to the other linkage element whereby said cam plate is rotated in said one direction.

6. In a parking brake for a power transmission mechanism, a parking gear carried by a driven shaft of said mechanism, said driven shaft being rotatably journalled within a stationary transmission housing, a parking pawl adapted for oscillatory motion about an axis that is parallel to the axis of said parking gear, a roller element carried by the extended end of said pawl, a cam plate pivotally mounted upon said housing for rotation about an axis that is perpendicularly disposed with respect to the axis of said parking gear, said cam plate comprising a cam portion engageable with said roller whereby said pawl is urged into locking engagement with said parking gear upon movement of said cam plate in one direction, a reaction shoulder formed on said transmission housing and situated adjacent said cam plate whereby thrust forces transmitted from said pawl to ssaid cam plate are transferred directly to said housing, a driver controlled linkage comprising two elements, one linkage element being pivotally connected to said cam plate, a yieldable lost motion connection between said linkage elements including means for applying a force to the other linkage element whereby said cam plate is rotated in said one direction, said force applying means comprising a cam lever pivotally mounted upon said transmission housing, a control link pivotally mounted for rotation about a fixed axis, and a pin connection between one end of said other linkage control element and the extended end of said control link including a pin that is common to each, said cam lever having a cam surface engageable with said pin whereby said other linkage element is moved to a brake release position in response to camming action of said cam surface with respect to said pin upon movement of said cam lever in one direction.

7. In a parking brake for a power transmission mechanism, a parking gear carried by a driven shaft of said mechanism, said driven shaft being rotatably journalled within a stationary transmission housing, a parking pawl adapted for oscillatory motion about an axis that is parallel to the axis of said parking gear, a roller element carried by the extended end of said pawl, a cam plate pivotally mounted upon said housing for rotation about an axis that is perpendicularly disposed with respect to the axis of said parking gear, said cam plate comprising a cam portion engageable with said roller whereby said pawl is urged into locking engagement with said parking gear upon movement of said cam plate in one direction, a reaction shoulder formed on said transmission housing and situated adjacent said cam plate whereby thrust forces transmitted from said pawl to said cam plate are transferred directly to said housing, a driver controlled linkage comprising two elements, one linkage element being pivotally connected to said cam plate, a yieldable lost motion connection between said linkage elements, means for applying a force to the other linkage element whereby said cam plate is rotated in said one direction, said force applying means comprising a cam lever pivotally mounted upon said transmission housing, and a control link pivotally mounted for rotation about a fixed axis, a pin connection between one end of said other linkage element and the extended end of said control link including a pin that is common to each, said cam lever having a cam surface engageable with said pin whereby said other linkage element is moved to a brake release position in response to camming action of said cam surface with respect to said pin upon movement of said cam lever in one direction, said cam portion comprising a relatively flat apex that is engaged by said roller when said pawl assumes a fully engaged position.

References Cited by the Examiner

UNITED STATES PATENTS

| 1,391,390 | 9/21 | Knapp | 188—69 |
| 2,211,741 | 8/40 | Elwell | 74—56 |
| 2,770,326 | 11/56 | Wayman | 188—69 |
| 2,875,856 | 3/59 | Mrlik et al. | 188—69 |
| 3,074,513 | 1/63 | Robinson | 188—69 |

FOREIGN PATENTS 517,123    12/20    France.

ARTHUR L. LA POINT, *Primary Examiner.*
EUGENE G. BOTZ, *Examiner.*